(12) United States Patent
Myung et al.

(10) Patent No.: US 10,972,410 B2
(45) Date of Patent: Apr. 6, 2021

(54) MANAGING CONTEXT INFORMATION BETWEEN CHATBOT AND USER DEVICE

(71) Applicant: KAKAO CORP., Jeju-si (KR)

(72) Inventors: No Suk Myung, Yongin-si (KR); Ji Soo Hwang, Yongin-si (KR); Jun Ki Kim, Suwon-si (KR); Hee Keung Lee, Seoul (KR)

(73) Assignee: KAKAO CORP, Jeju-si (KR)

( * ) Notice: Subject to any disclaimer, the term of this patent is extended or adjusted under 35 U.S.C. 154(b) by 165 days.

(21) Appl. No.: 16/233,312

(22) Filed: Dec. 27, 2018

(65) Prior Publication Data

US 2019/0207878 A1  Jul. 4, 2019

(30) Foreign Application Priority Data

Dec. 29, 2017  (KR) .......................... 10-2017-0183866

(51) Int. Cl.
*G06F 16/332* (2019.01)
*G06F 16/31* (2019.01)
*H04L 12/58* (2006.01)

(52) U.S. Cl.
CPC ............ *H04L 51/02* (2013.01); *G06F 16/316* (2019.01); *G06F 16/3329* (2019.01); *H04L 51/16* (2013.01)

(58) Field of Classification Search
CPC ................. G06F 16/3329; G06F 40/30; G06F 16/24575; G06F 16/9535; G06F 16/3344; G06F 16/90332; G06F 16/243; G06F 16/24522; G06F 16/24578

USPC .......................................................... 707/710
See application file for complete search history.

(56) References Cited

U.S. PATENT DOCUMENTS

| | | | |
|---|---|---|---|
| 10,418,032 B1 * | 9/2019 | Mohajer | G06F 16/3329 |
| 2013/0174034 A1 * | 7/2013 | Brown | G06Q 10/10 715/708 |
| 2018/0052824 A1 * | 2/2018 | Ferrydiansyah | G06F 40/30 |
| 2018/0131643 A1 * | 5/2018 | Trufinescu | G06F 3/048 |
| 2018/0174020 A1 * | 6/2018 | Wu | G06N 3/08 |
| 2018/0225365 A1 * | 8/2018 | Altaf | G06F 16/3344 |
| 2018/0358006 A1 * | 12/2018 | McConnell | G06F 40/35 |
| 2019/0019077 A1 * | 1/2019 | Griffin | G06N 5/041 |
| 2020/0202194 A1 * | 6/2020 | Wu | G06N 3/004 |

FOREIGN PATENT DOCUMENTS

| | | |
|---|---|---|
| KR | 100979516 B1 | 9/2010 |
| KR | 1020130104569 A | 9/2013 |
| KR | 1020140031422 A | 3/2014 |
| KR | 101605430 B1 | 3/2016 |

* cited by examiner

*Primary Examiner* — Dangelino N Gortayo
(74) *Attorney, Agent, or Firm* — Hamre, Schumann, Mueller & Larson, P.C.

(57) ABSTRACT

A chatbot server that manages context information between a chatbot and a user device includes a receiving unit that receives, from a messenger server, a question message input for a service selected from multiple services by the user device and service account information corresponding to the selected service; a derivation unit that derives an answer to the question message by using the chatbot corresponding to the service account information; and a context information management unit that manages context information of a chat between the user device and the chatbot based on the question message and/or the answer.

11 Claims, 5 Drawing Sheets

| DATA STRUCTURE FORM | ATTRIBUTE VALUE | DETAILED FUNCTION |
|---|---|---|
| 301 — VARIABLE STRUCTURE | EXPIRATION INFORMATION | |
| 303 — SET STRUCTURE | EXPIRATION INFORMATION, MANAGEMENT VOLUME INFORMATION | ADD FUNCTION, DELETE FUNCTION |
| 305 — LIST STRUCTURE | EXPIRATION INFORMATION, MANAGEMENT VOLUME INFORMATION | PREPEND FUNCTION, APPEND FUNCTION, DELETE FUNCTION |

MANAGING CONTEXT INFORMATION BETWEEN CHATBOT AND USER DEVICE

CROSS-REFERENCE TO RELATED APPLICATION

This application claims the benefit under 35 USC 119(a) of Korean Patent Application No. 10-2017-0183866 filed on Dec. 29, 2017, in the Korean Intellectual Property Office, the entire disclosures of which are incorporated herein by reference for all purposes.

TECHNICAL FIELD

The present disclosure relates to technologies for managing context information between a chatbot and a user device and more particularly, and technologies for managing context information between a chatbot and a user device based on a data structure form selected from multiple data structure forms.

BACKGROUND

A chatbot is an artificial intelligence communication program that provides humans with right answers to questions or various relevant information through text chat with the humans based on artificial intelligence. Such a chatbot is provided as an interactive service using a messenger application according to preset rules or artificial intelligence technologies.

According to a conventional method for managing context information using a chatbot, context information has been managed by loading all existing context information from a DB and adding new context information to all the existing context information or deleting existing context information to update the context information and then overwriting all the updated context information on all existing context information stored in the DB.

In the conventional method for managing context information, a processor for storing context information is complicated. Therefore, when a botbuilder manager uses the conventional method, it is difficult to manage context information.

SUMMARY

In view of the foregoing, the present disclosure provides a server and a method for managing context information of a chat between a user device and a chatbot by using at least one of multiple data structure forms.

Further, the present disclosure provides a server and a method for mapping multiple key values to multiple data structure forms, respectively, and managing context information of a chat between a user device and a chatbot according to a data structure form to which a key value corresponding to the context information is mapped.

Furthermore, the present disclosure provides a server and a method for managing context information of a chat between a user device and a chatbot according to a detailed function relevant to a key value corresponding to the context information among detailed functions set for multiple data structure forms, respectively.

Moreover, the present disclosure provides a server and a method for managing context information of a chat between a user device and a chatbot by using multiple data structure forms which is easy to partly update and delete the context information under management and add new information.

At least some of the embodiments described herein pertain to a chatbot server that manages context information between a chatbot and a user device that includes: a receiving unit that receives, from a messenger server, a question message input for a service selected from multiple services by the user device and service account information corresponding to the selected service; a derivation unit that derives an answer to the question message by using the chatbot corresponding to the service account information; and a context information management unit that manages context information of a chat between the user device and the chatbot based on the question message and/or the answer.

At least one of the embodiments described herein pertains to a method for managing context information between a chatbot and a user device that includes: receiving, from a messenger server, a question message input for a service selected from multiple services by the user device and service account information corresponding to the selected service; deriving an answer to the question message by using the chatbot corresponding to the service account information; and managing context information of a chat between the user device and the chatbot based on the question message and/or the answer.

According to any one of the embodiments described above, it is possible to provide a server and a method for managing context information of a chat between a user device and a chatbot by using at least one of multiple data structure forms.

Further, it is possible to provide a server and a method for mapping multiple key values to multiple data structure forms, respectively, and managing context information of a chat between a user device and a chatbot according to a data structure form to which a key value corresponding to the context information is mapped. Specifically, the present disclosure can provide a server and a method in which key values mapped to multiple data structure forms are used to access/manage context information of a chat between a user device and a chatbot and thus make it easy to load a desired value without loading and processing all data under management to find a desired value, and, thus, it becomes easier to access data defined and structured by a botbuilder manager.

Furthermore, it is possible to provide a server and a method for managing context information of a chat between a user device and a chatbot according to a detailed function relevant to a key value corresponding to the context information among detailed functions set for multiple data structure forms, respectively. Specifically, the present disclosure can provide a server and a method in which context information is processed through add, update, and delete operations in a guaranteed order according to corresponding detailed functions (e.g., add, delete, prepend, append, etc.) set for respective data structure forms, which enables a botbuilder manager to easily add, update, and delete data to be accumulated by using preset detailed functions of the multiple data structure forms.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3A to FIG. 3C are an illustration of an example of to explain a method for storing context information between a chatbot and a user device in accordance with various embodiments described herein.

DETAILED DESCRIPTION

Hereafter, example embodiments of the present disclosure will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the "units" can be combined with each other or can be divided up into additional components. Further, the components and the "units" may be configured to implement one or more CPUs in a device or a secure multimedia card.

The term "user device" to be described below may be implemented with computers or portable devices which can access a server or another device through a network.

Figure 1:
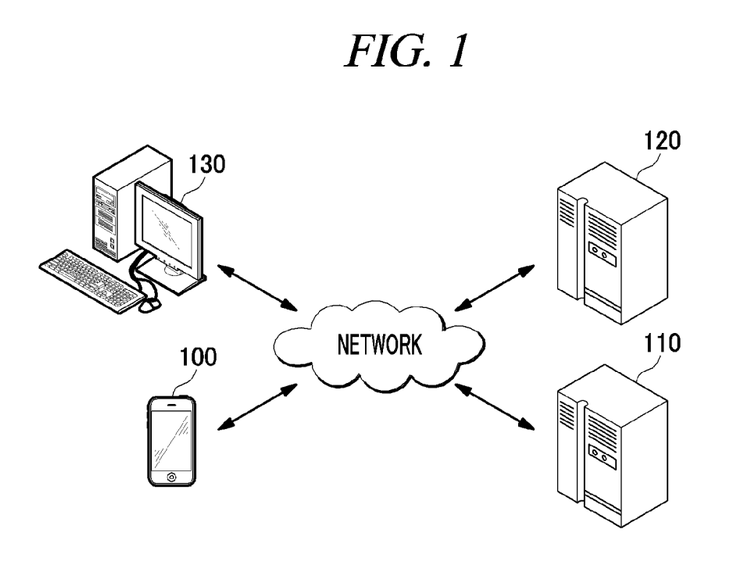
FIG. 1 is an illustration of an example of a context information management system in accordance with various embodiments described herein.

FIG. 1 is an illustration of an example of a context information storage system in accordance with an embodiment of the present disclosure.

Referring to FIG. 1, a context information management system may include a user device 100, a messenger server 110, a chatbot server 120, and a manager device 130. The context information management system illustrated in FIG. 1 is just an embodiment of the present disclosure and should not be construed as liming the present disclosure. That is, the context information management system can be configured differently from that shown in FIG. 1 according to various embodiments of the present disclosure.

Friends who can be registered through a messenger app installed in the user device 100 may include real friends and virtual friends.

A user of the user device 100 may register another user without a profit-making purpose (e.g., family, acquaintances, coworkers, etc.) as a real friend through the messenger app.

The user device 100 may provide the user with an instant messaging service that enables the user of the user device 100 to exchange chats with the other user registered as a real friend in a chat room through the messenger app installed in the user device 100.

The user of the user device 100 may register an official account corresponding to a specific service as a virtual friend through the messenger app. The official account may refer to an account that is managed by a specific company and organization to provide the specific service. For example, the official account may provide information about the specific service to the user device 100 through a chat room established for the official account and the user of the user device 100. The user of the user device 100 may register the official account as a virtual friend and receive the information about the specific service from the official account. Even if the user of the user device 100 does not register the official account as a virtual friend, the user of the user device 100 may also receive the information about the specific service.

The official account may use a chatbot to provide the user device 100 with the information about the specific service provided by the specific company and organization. A manager of the official account may create the chatbot through a user interface for botbuilder provided by the chatbot server 120 and link the created chatbot to the official account to provide the information about the specific service (for example, an answer to a question message relevant to the specific service). Further, the manager of the official account may manage the official account matched with a chatbot one to one through the user interface for botbuilder or extend and link the official account to multiple chatbots. According to the present disclosure, it is possible to create and manage context information of a chat between the user device 100 and the official account registered as a virtual friend.

Further, the user of the user device 100 may register a chatbot corresponding to the specific service as a virtual friend through the messenger app, and the user device 100 may be provided with an answer to a question message through the chatbot. According to the present disclosure, it is possible to create and manage context information of a chat between the user device 100 and the chatbot registered as a virtual friend.

Therefore, if the user device 100 registers an official account as a virtual friend and the official account is mapped to a chatbot, the user device 100 may be provided with an answer to a question message through the chatbot linked to the official account, and if the user device 100 registers a chatbot as a virtual friend, the user device 100 may be provided with an answer to a question message through the chatbot.

The user device 100 may provide the user with an instant messaging service that enables the user to exchange chats with, e.g., a chatbot or an official account registered as a virtual friend in a chat room through the messenger app. Further, the user device 100 may invite the chatbot registered as a virtual friend into a chatroom established for the user device 100 and a real friend. In this case, context information of a chat exchanged among the user device 100, the real friend, and the invited chatbot may be created.

The user device 100 may selects any one from multiple services provided through the messenger app installed in the user device 100 from the user. For example, the multiple services may include a service provided by the official account and a service provided by the chatbot. If the user selects the official account or the chatbot which are virtual friends, the user can be provided with the service provided by the official account or the service provided by the chatbot through the chat room.

If the user device 100 selects one from the multiple services provided through the messenger app installed in the user device 100 from the user, the user device 100 may transmit service account information corresponding to the selected service to the messenger server 110. For example, the service account information may include a chatbot ID corresponding to the selected service or service account information of an official account corresponding to the selected service.

Further, if the user device 100 receives a question message relevant to the service selected by the user from the user through the chat room, the user device 100 may transmit the question message to the messenger server 110. The service account information and the question message may be transferred to the chatbot server 120 via the messenger server 110.

The messenger server 110 may provide an instant messaging service that enables the user of the user device 100 to exchange chats with another user registered as a real friend in a chat room. Further, the messenger server 110 may provide an instant messaging service that enables the user device 100 to exchange chats with a chatbot or official account registered as a virtual friend at the messenger app.

For example, if the messenger server 110 receives a chatbot ID and a question message relevant to the selected service from the user device 100, the messenger server 110 may transfer the received chatbot ID and question message to the chatbot server 120. For another example, if the messenger server 110 receives service account information and a question message relevant to the selected service from the user device 100, the messenger server 110 may transfer the received service account information (or a chatbot ID mapped to the received service account information) and the received question message to the chatbot server 120.

The messenger server 110 may receive an answer to the question message derived through the chatbot from the chatbot server 120. The messenger server 110 may transmit the received answer to a chat room established for the user of the user device 100 and the chatbot or a chat room established for the user of the user device 100 and the official account.

The chatbot server 120 is a server that provides the instant messaging service using a chatbot and may be configured to receive service account information and a question message from the messenger server 110 and derive an answer to the question message by using a chatbot corresponding to the service account information. The chatbot server 120 may transmit the derived answer to the messenger server 110.

The answer transmitted to the messenger server 110 may be transmitted to the user device 100.

The chatbot server 120 may provide a botbuilder user interface (UI) for creating/managing a chatbot to the manager device 130 of a botbuilder manager. Thus, the botbuilder UI can be driven in the manger device 130. The present disclosure enables the manager device 130 to use the botbuilder UI to manage context information of a chat between the user device 100 and a chatbot.

The chatbot server 120 may create and manage context information of a chat between the user device 100 and a chatbot based on a question message and/or an answer in a chat room.

The context information refers to data about the context/flow which can be found from the chat between the user device 100 and the chatbot and may include at least one sequence (for example, a question message created by a user device and an answer of a chatbot to the question message can be considered as a sequence) as a basic unit.

The chatbot server 120 of the present disclosure may use multiple data structure forms to efficiently store or manage context information. If a chat room is established for the user of the user device 100 and the chatbot and a chat progresses between the user device 100 and the chatbot through the established chat room, the chatbot server 120 may create and manage context information of the chat according to a data structure form selected by the manager device 130 of the botbuilder manager through the botbuilder UI provided by the chatbot server 120.

If a next chat progresses between the user device 100 and the chatbot, the chatbot server may find the intent for a question message by using the context information under management and perform an action corresponding to the question message according to the found intent.

The chatbot server 120 may manage context information based on at least one of multiple data structure forms. Herein, the multiple data structure forms may include at least two of, for example, a Variable structure, a Set structure, or a List structure.

The manager device 130 is a device used by the botbuilder manager and may include devices linked to the chatbot server 120 to create and manage chatbots. The botbuilder manager may be a user registered at the chatbot server 120. For example, the botbuilder manager can access the chatbot server 120 through the manager device 130 to create and manage a chatbot through the botbuilder UI provided by the chatbot server 120 and can also manage context information corresponding to each chatbot.

The present disclosure relates to the invention for managing context information of a chat between a user device and a chatbot and is provided to manage the context/flow based on the chat between the user device and the chatbot by using a data structure form.

The chat between the user device and the chatbot may include at least one sequence which is composed of a question message created from the user device and an answer to the question message derived by the chatbot. According to the present disclosure, context information which is the context of the chat between the user device and the chatbot can be created from the at least one sequence.

Accordingly, context information is created between a user of a user device and a chatbot directly chatting with the user of the user device, and the user of the user device may not access context information with respect to another chatbot while chatting with the chatbot. In other words, context information of a chat between a user of a user device and a chatbot may be created independently of a chat with another chatbot.

The operations of the respective components included in the context information management system illustrated in FIG. 1 will be described in more detail with reference to the accompanying drawings.

Figure 2:
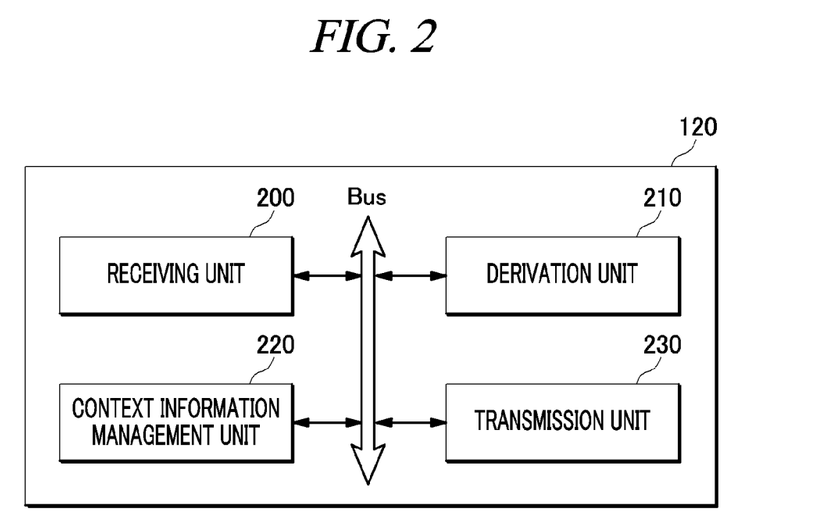
FIG. 2 is a block diagram illustrating an example of a chatbot server in accordance with various embodiments described herein.

FIG. 2 is a block diagram illustrating an example of the chatbot server 120 in accordance with an embodiment of the present disclosure. Referring to FIG. 2, the chatbot server 120 according to an embodiment of the present disclosure may include a receiving unit 200, a derivation unit 210, and a context information management unit 220. However, the chatbot server 120 according to an embodiment of the present disclosure can be configured differently from that shown in FIG. 2.

If the receiving unit 200 selects at least one from multiple services registered at a messenger app that provides an instant messaging service from the user of the user device 100, the receiving unit 200 may receive service account information corresponding to the selected service from the messenger server 110. For example, a service provided by a specific official account is selected from among the multiple services by the user of the user device 100, the receiving unit 200 may receive service account information corresponding to the selected service from the messenger server 110. For another example, if a service provided by a specific chatbot is selected from among the multiple services by the user of the user device 100, the receiving unit 200 may receive a chatbot ID corresponding to the selected service from the messenger server 110.

Further, the receiving unit 200 may receive a question message input for a service selected by the user device 100 from the messenger server 110. For example, if the user selects a song service, the receiving unit 200 may receive a question message relevant to the song service from the messenger server 110.

The derivation unit 210 may derive an answer to a question message using a chatbot corresponding to service account information. For example, if a chatbot ID of a chatbot to process a question message is received from the messenger server 110, the derivation unit 210 may transfer the chatbot ID to a bot DB (not illustrated) and the bot DB may detect bot metadata corresponding to the received chatbot ID from bot-relevant metadata stored therein. Then, the derivation unit 210 may receive the bot metadata of the chatbot corresponding to the chatbot ID from the bot DB and derive an answer to the question message based on the received bot metadata of the chatbot.

The context information management unit 220 may create and manage context information of a chat between the user device 100 and the chatbot based on the question message and/or the answer derived by the derivation unit 210.

The context information management unit 220 may set a region for creating context information for each chat between the user device 100 and the chatbot and find an intent (e.g., a basic unit of the user's intent) for the question message input by the user device 100 and extract a keyword for creating context information from the question message. The context information may be created including a sequence composed of a question message created by the user device and an answer derived by the chatbot as a basic unit.

The context information is a factor that determines the flow or context of a chat between the user device 100 and the chatbot and may be used to determine how a next chat will progress according to a previous chat. In other words, context information of the previous chat may be stored to progress the next chat based on the context of the previous chat.

Context information is created whenever the user inputs a question message and the chatbot gives an answer to the question message, and the lifecycle of context information stored in a DB may be determined by expiration information set for each context information. For example, if the user of the user device 100 inputs a first question message (e.g., "Play IU's song") and the chatbot gives an answer (e.g., "I'll play IU's hit song playlist") to the first question message, the context information management unit 220 may create first context information to store a chat context between the first question message and the answer to the first question message.

Figure 3A:
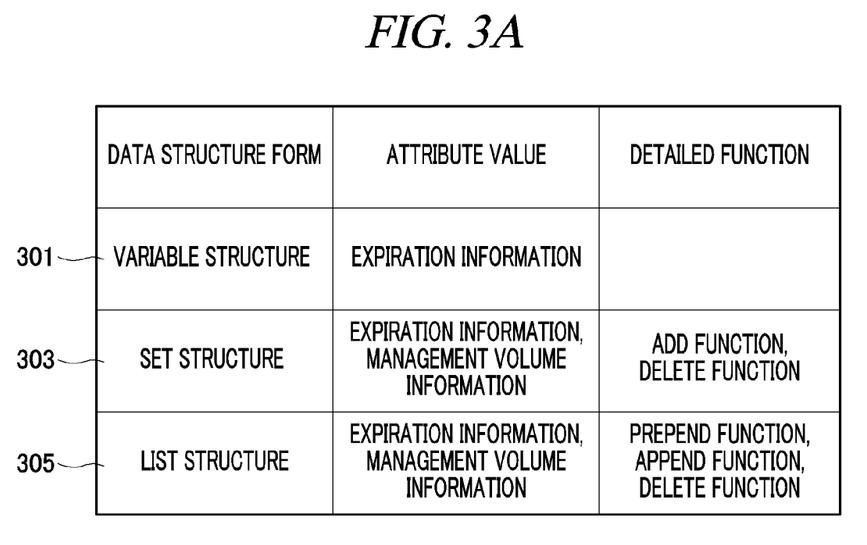

The context information management unit 220 may manage context information based on at least one of multiple data structure forms. Referring to FIG. 3A, the multiple data structure forms refer to data forms to efficiently store and manage context information and may include at least two of, for example, a Variable structure 301, a Set structure 303, or a List structure 305.

In the Variable structure 301, context information managed by using the Variable structure 301 cannot be partly updated (added, deleted). In other words, if context information is managed by using the Variable structure 301, only all the context information under management can be updated. As for context information stored by using the Variable structure 301, expiration information of the context information can be set.

In the Set structure 303, an Add function and a Delete function can be performed. Specifically, the Set structure 303 is set to have a function of adding other context information to context information managed by using the Set structure 303 or removing other context information from the context information managed by using the Set structure 303.

In the List structure 305, a Prepend function, an Append function, and a Delete function can be performed. Specifically, the List structure 305 is set to have a function of adding other context information to a front end or a back end of context information managed by using the List structure 305 or removing other context information from the context information managed by using the List structure 305, and, thus, the context information can be updated.

For example, it can be assumed that first to fifth songs have been stored in a song list as context information in each data structure form and a sixth song is added to the song list. In the Variable structure 301, the first to fifth songs included in the song list need to be retrieved to add the sixth song to the song list and the song list is stored again as an existing song list, and, thus, an update of the song list is very complicated.

Meanwhile, in the Set structure 303, the song list can be updated by adding the sixth song to the song list corresponding to the context information under management without a need to retrieve the song list from the DB.

As for context information managed by using the Set structure 303 or the List structure 305, expiration information and management volume information of the context information can be set. Herein, the lifecycle may be determined differently for each context information. The expiration information of the context information may include lifespan information and time-to-live (TTL) information.

The lifespan information refers to the lifecycle of created or accumulated context information and may be set as the period or number of times to retain the context information.

For example, whenever a chat progresses between the user device 100 and a chatbot, a predetermined value is subtracted from a lifespan value, and if a chat progresses in a slot filling state, the lifespan value can be maintained without subtraction from the lifespan value until the completion of the slot filling state.

The TTL information refers to the maximum time for context information to stay from the time when the context information is initially created time. For example, context information is stored in seconds and retained from the time when the context information is created to the TTL information set by the botbuilder manager.

For example, first context information may be created based on a first chat (a first question message and a first answer) between the user device 100 and a chatbot and first expiration information may be set for the created first context information. Herein, the first context information is retained and managed according to lifespan information or TTL information included in the first expiration information, and if the lifespan information or TTL information expires, the first context information is deleted from the DB.

The management volume information of context information refers to the maximum number of context information which can be stored. For example, as for context information managed by using the Set structure 303, if the management volume information is set up to 50, context information corresponding to the number 50 may be managed by using the Set structure 303.

The context information management unit 220 may map multiple key values to the respective multiple data structure forms. Herein, the multiple key values may include, for example, a specific text or a parameter name that activates a specific detailed function. For example, the context information management unit 220 may map a text relevant to a delete operation, such as "Delete" or "Exclude", to the Set structure 303 and a parameter name, such as "List", to the List structure 305.

The context information management unit 220 may map the multiple key values to each detailed function set for the Set structure 303 or the List structure 305. For example, the context information management unit 220 may map a text relevant to an add operation, such as "Add" or "Include", to an Add function of the Set structure 303 and a text relevant to a delete operation, such as "Delete" or "Exclude", to a Delete function of the Set structure 303.

Figure 3B:
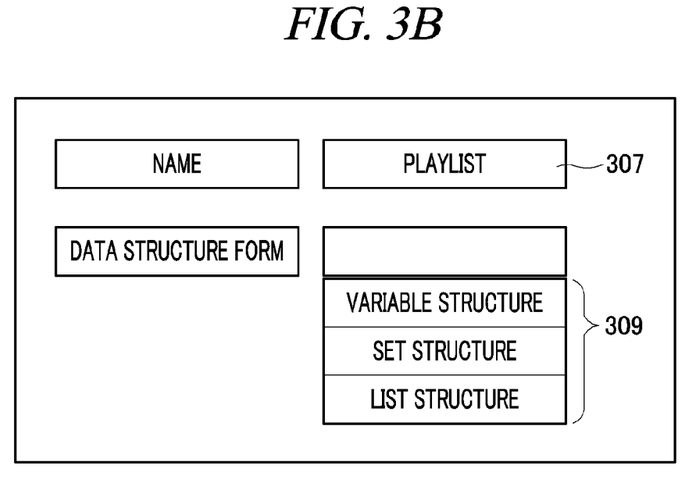
Figure 3C:
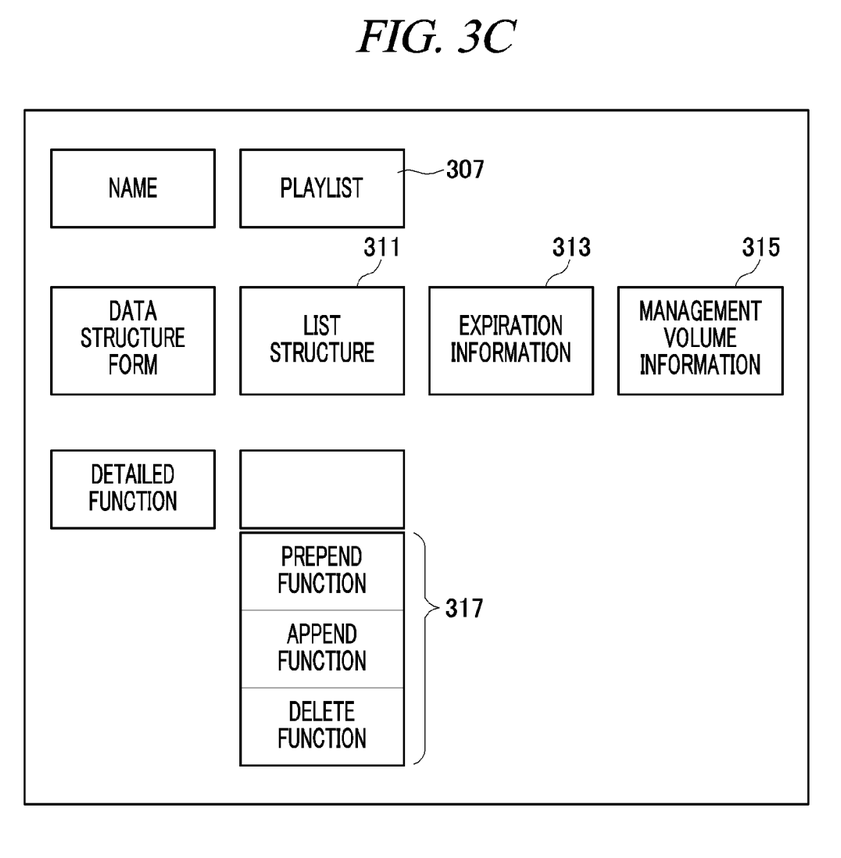

Referring to FIG. 3B and FIG. 3C, the context information management unit 220 may provide the manager device 130 of the botbuilder manager with a botbuilder UI through which a name 307 of context information to be created is input by the botbuilder manager based on a question message input by the user device 100 or an answer derived by a chatbot.

The botbuilder manager can access the chatbot server 120 through the manager device 130, create a chatbot through the botbuilder UI provided by the chatbot server 120, and set a data structure form to create and manage specific context information for the created chatbot and the user device.

The context information management unit 220 may provide the manager device 130 with an interface through which at least one of multiple data structure forms 309 is selected and manage context information based on a data structure form 311 selected among the multiple data structure forms 309 by the botbuilder manager through the manager device 130. Referring to an embodiment illustrated in FIG. 3B and FIG. 3C, the user interface may display a Variable structure, a Set structure, and a List structure as the multiple data structure forms 309 through the manager device 130 and the botbuilder manager may select the List structure 311 among the data structure forms displayed through the manager device 130.

The context information management unit 220 may provide the manager device 130 with an interface through which at least one of expiration information 313 and management volume information 315 is set for context information to be managed by using the selected data structure form 311. The context information is managed based on the expiration information 313 and management volume information 315 set for the context information by the botbuilder manager.

The context information management unit 220 may provide the manager device 130 of the botbuilder manager with an interface through which at least one detailed function 317 set for the selected data structure form 311 is selected and manage the context information according to a detailed function set by the botbuilder manager. For example, if the selected data structure form 311 is a List structure, the context information management unit 220 may provide the manager device 130 with an interface through which any one of a Prepend function, an Append function, and a Delete function can be selected as the detailed function 317.

Referring to FIG. 2 again, the context information management unit 220 may determine whether or not context information created based on a question message and/or an answer corresponds to at least one of multiple key values mapped to a data structure form selected by the botbuilder manager through the manager device 130.

If the context information corresponds to at least one of the multiple key values mapped to the selected data structure form, the context information management unit 220 may manage the context information according to the selected data structure form. For example, if a specific keyword (e.g., "Add") included in second context information corresponds to a key value mapped to a Set structure among the multiple data structure forms, the context information management unit 220 may add the second context information after context information accumulated in the Set structure. For example, if a specific keyword (e.g., "Add") included in the second context information corresponds to a key value mapped to a Set structure among the multiple data structure forms and expiration time included in expiration information of first context information among context information accumulated in the Set structure elapses, the first context information may be deleted from the Set structure and replaced with second context information.

For example, if a specific keyword (e.g., "Add list") included in third context information corresponds to a key value mapped to a List structure among the multiple data structure forms, the context information management unit 220 may add the third context information after context information accumulated in the List structure.

The context information management unit 220 may manage context information according to a detailed function for a key value corresponding to the context information among one or more detailed functions set for a selected data structure form. For example, if a function for a specific keyword (e.g., "Add to the top") included in fourth context information corresponds to a first detailed function (add to a front end of context information under management) set for a List structure, the context information management unit 220 may add the fourth context information to a front end of context information accumulated in the List structure. For example, if a function for a specific keyword (e.g., "Delete") included in the fourth context information corresponds to a third detailed function (delete from context information under management) set for the List structure, the context information management unit 220 may remove the fourth context information from the context information accumulated in the List structure.

When the context information management unit 220 manages context information according to a Set structure, the context information management unit 220 may manage the context information regardless of the order of storage and manage the context information not to be duplicable. In other words, the Set structure may be mainly used to determine whether or not to store/manage context information in any order.

One or more detailed functions set for a Set structure may include at least one of a function of adding context information to context information under management (Add) and a function of deleting context information from context information under management (Delete). For example, in the Set structure, if the Add function is performed to specific context information, the specific context information may be added in any order to existing context information being managed by using the Set structure. Herein, if the existing context information under management already includes the same information as the specific context information, the Add function may not be performed to the specific context information. For another example, in the Set structure, if the Delete function is performed to specific context information, information corresponding to the specific context information may be removed from the existing context information being managed by using the Set structure.

If the context information management unit 220 manages context information according to a List structure, the context information management unit 220 may manage the context information in the order of storage and manage the context information to be duplicable. In other words, the List structure may be mainly used when the order of context information such as a song playlist is a main management target.

One or more detailed functions set for a List structure may include at least one of a function of adding context information to a front end of context information under management (Prepend), a function of adding context information to a back end of context information under management (Append), and a function of deleting context information from context information under management (Delete). For example, in the List structure, if the Prepend function is performed to specific context information, the specific context information may be added to a front end of existing context information being managed by using a Set structure. In this case, even if the existing context information under management already includes the same information as the specific context information, the Prepend function can be performed to the specific context information. For another example, in the List structure, if the Append function is performed to specific context information, the specific context information may be added to a back end of existing context information being managed by using a Set structure. In this case, even if the existing context information under management already includes the same information as the specific context information, the Append function can be performed to the specific context information. For yet another example, in the List structure, if the Delete function is performed to specific context information, information corresponding to the specific context information may be removed from the existing context information being managed by using the List structure.

If context information does not correspond to at least one of the multiple key values mapped to the selected data structure form, the context information management unit 220 may determine whether or not to create an additional key value corresponding to the context information for the selected data structure form.

If the context information management unit 220 needs to access with an additional key value to manage context information in a next chat after the current chat, the context information management unit 220 may determine that the additional key value needs to be created.

For example, it can be assumed that key values "Mt. Baekdu" and "Mt. Halla" are mapped to a Set structure. When a keyword "Mt. Seorak" appears in an additional chat, if the context information management unit 220 needs to access with a key value "Mt. Seorak" to manage context information in the additional chat, the context information management unit 220 may add the keyword "Mt. Seorak" as an additional key value.

In other words, the botbuilder manager can map a specific key value to each data structure form by using the botbuilder UI provided by the chatbot server 120 to design a desired context information management policy and also supplement the management of context information with an additional key value as described above.

Therefore, the context information management unit 220 can dynamically create an additional key value besides multiple key values mapped to each data structure form.

If the derivation unit 210 receives an additional question message input for a selected service from the messenger server 110, the derivation unit 210 may derive an answer to the additional question message by using the context information being managed by the chatbot. The derived answer may be transmitted to the user device 100 via the messenger server 110.

For example, if the user device 100 is provided with a service from the first chatbot, the derivation unit 210 may derive an answer by using context information created from multiple chats between the user device 100 and the first chatbot through the first chatbot that manages the context information.

For example, if the user of the user device 100 inputs a first question message (e.g., "Play IU's song") and the chatbot gives an answer (e.g., "I'll play IU's hit song playlist") to the first question message, the context information management unit 220 may create first context information (e.g., "IU's song playlist information") to store a chat context between the first question message and the answer to the first question message, and then if the user inputs a second question message (e.g., "Next song"), the derivation unit 210 may derive an answer (e.g., select a next song after the currently played song from the IU's song playlist) to the second question message by using the first context information.

Meanwhile, if a chat progresses between the user device 100 and the first chatbot, the derivation unit 210 cannot access context information managed by other chatbots except the first chatbot in connection with the chat between the user device 100 and the first chatbot and thus cannot use the context information managed by the other chatbots.

A transmission unit 230 may transmit the derived answer to the question message and/or additional question message to the messenger server 110, and the answer may be transmitted from the messenger server 110 to the user device 100.

Figure 4:
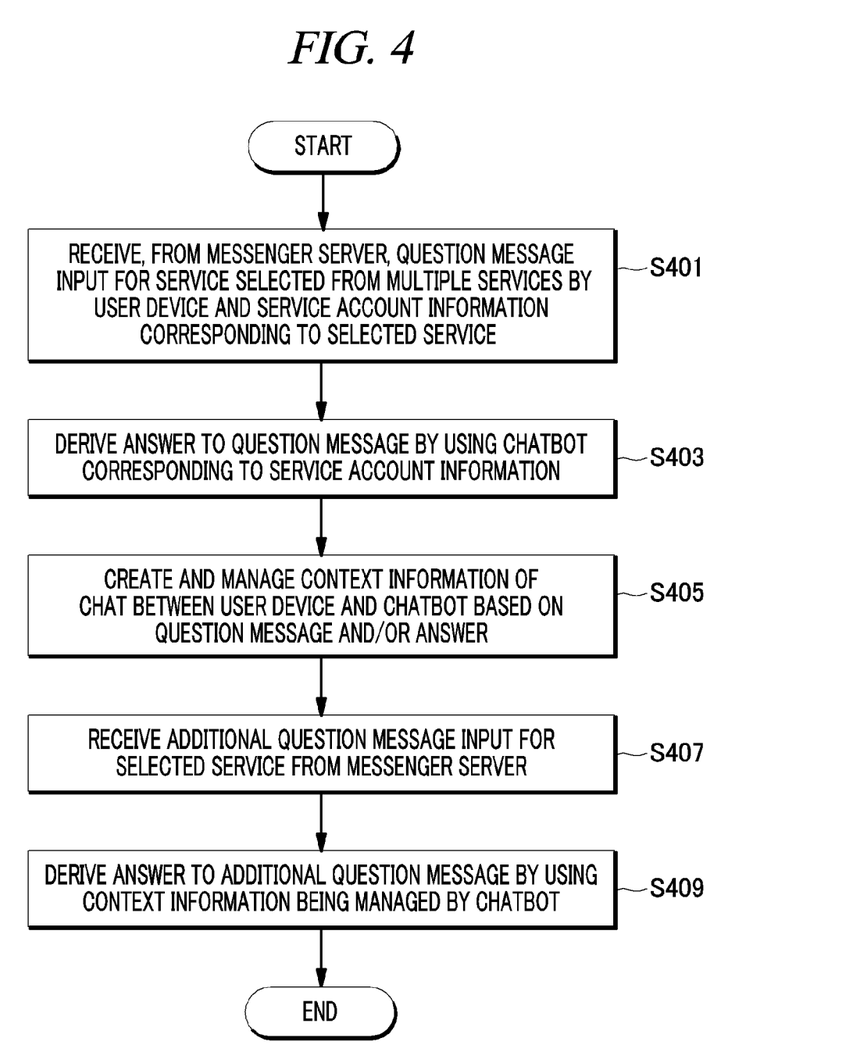
FIG. 4 is a flowchart illustrating an example processing flow for storing context information between a chatbot and a user device through a chatbot server in accordance with various embodiments described herein.

FIG. 4 is a flowchart illustrating an example processing flow for storing context information between a chatbot and a user device through the chatbot server 120 in accordance with an embodiment of the present disclosure. Referring to FIG. 4, in a process S401, the chatbot server 120 may receive a question message input for a service selected from among multiple services by the user device 100 and service account information corresponding to the selected service from the messenger server 110. In a process S403, the chatbot server 120 may derive an answer to the question message by using a chatbot corresponding to the service account information. In a process S405, the chatbot server 120 may create and manage context information of a chat between the user device 100 and the chatbot based on the question message and/or the answer. In a process S407, the chatbot server 120 may receive an additional question message input by the user device 100 for the selected service from the messenger server 110. In a process S409, the chatbot server 120 may derive an answer to the additional question message by using the context information being managed by the chatbot.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A chatbot server that manages context information between a chatbot and a user device, comprising:
    a receiving unit that receives, from a messenger server, a question message input for a service selected from multiple services by the user device and service account information corresponding to the selected service;
    a derivation unit that derives an answer to the question message by using the chatbot corresponding to the service account information; and
    a context information management unit that manages context information of a chat between the user device and the chatbot based on the question message and/or the answer by:
    selecting at least one from multiple data structure forms, mapping key values to respective ones of the selected data structure forms, and
    activating a specific detailed function, set for the selected data structure form, corresponding to the mapped key values to manage the respective context information.

2. The chatbot server of claim 1, wherein the multiple data structure forms include a Set structure and a List structure.

3. The chatbot server of claim 2, wherein one or more detailed functions set for the Set structure include at least one of a function of adding the context information to context information under management and a function of deleting the context information from context information under management.

4. The chatbot server of claim 3, wherein if the context information management unit manages the context information according to the Set structure, the context information management unit manages the context information regardless of an order of storage and manages the context information not to be duplicable.

5. The chatbot server of claim 2, wherein one or more detailed functions set for the List structure include at least one of a function of adding the context information to a front end of context information under management, a function of adding the context information to a back end of context information under management, and a function of deleting the context information from context information under management.

6. The chatbot server of claim 5, wherein if the context information management unit manages the context information according to the List structure, the context information management unit manages the context information in an order of storage and manages the context information to be duplicable.

7. The chatbot server of claim 1, wherein the context information management unit sets at least one of expiration information and management volume information of the context information for each of the multiple data structure forms.

8. The chatbot server of claim 1, wherein if the derivation unit receives, from the messenger server, an additional question message input for the selected service, the derivation unit derives an answer to the additional question message by using the context information being managed by the chatbot.

9. The chatbot server of claim 1, wherein if the context information does not correspond to at least one of multiple key values mapped to the selected data structure form, the context information management unit determines whether or not to create an additional key value corresponding to the context information for the selected data structure form.

10. A method for managing context information between a chatbot and a user device, comprising:
    receiving, from a messenger server, a question message input for a service selected from multiple services by the user device and service account information corresponding to the selected service;
    deriving an answer to the question message by using the chatbot corresponding to the service account information; and
    managing context information of a chat between the user device and the chatbot based on the question message and/or the answer by:

selecting at least one from multiple data structure forms,
mapping key values to respective ones of the selected data structure form, and
activating a specific detailed function, set for the selected data structure form, corresponding to the mapped key values to manage the respective context information.

11. The method for managing context information of claim 10, further comprising:
receiving, from the messenger server, an additional question message input for the selected service; and
deriving an answer to the additional question message by using the context information being managed by the chatbot.

\* \* \* \* \*